United States Patent Office 2,952,712
Patented Sept. 13, 1960

2,952,712
ADDUCTS OF HEXACHLOROCYCLOPENTADI-
ENE AND MONOVINYL AROMATIC COM-
POUNDS

Carleton W. Roberts, Midland, and Daniel H. Haigh, Beaverton, Mich., assignors to The Dow Chemical Company, Midland, Mich., a corporation of Delaware No Drawing. Filed Mar. 27, 1959, Ser. No. 802,295

5 Claims. (Cl. 260—650)

The invention concerns new chemical compounds which are adducts of hexachlorocyclopentadiene and certain monovinyl aromatic compounds, and pertains to a method of making the same.

U.S. Patent No. 2,606,910 makes an adduct of hexachlorocyclopentadiene and styrene by heating approximately equimolecular proportions of styrene and hexachlorocyclopentadiene in admixture with one another at a temperature of 150° C. in a sealed tube.

It is an object of the invention to prepare new chemical compounds which are adducts of hexachlorocyclopentadiene and substituted monovinyl aromatic compounds such as vinyltoluene, ar-ethylstyrene, 2,4-dichlorostyrene and 4-tert.-butylstyrene. Another object is to provide a method for making such compounds. Other objects and advantages will appear from the following description of the invention.

According to the invention new chemical compounds which are adducts of hexachlorocyclopentadiene and a substituted monovinyl aromatic compound such as vinyltoluene, ar-ethylstyrene, 2,4-dichlorostyrene or 4-tert.-butylstyrene can readily be obtained by reacting hexachlorocyclopentadiene with the monovinyl aromatic compound, preferably in the presence of an inert organic solvent, and separating the addition product from the reacted mixture.

The new chemical compounds are high boiling liquids or solid crystalline materials. Some of the compounds are useful as herbicides, e.g. for the control of certain water weeds, while other of the compounds are useful as an insecticide, or as a fungicide. They are all useful as intermediates in the production of other new and valuable compounds. Because of their high chlorine content the new compounds are useful as fire retardant and flameproofing agents, particularly for plastics such as polystyrene or copolymers of styrene and other vinyl monomers, e.g. copolymers of styrene and methyl methacrylate. The compounds are not only useful as fire retardant and flameproofing agents for such polymers, but they also serve as plasticizers and flow agents for facilitating the molding of the polymers to form articles useful for a variety of purposes.

The monovinyl aromatic compound to be employed in making the new compounds can be ortho-, meta- or para-vinyltoluene or a mixture of the isomeric vinyltoluenes, ortho-, meta- or para-ethylstyrene, 2,4-dichlorostyrene or 4-tert.-butylstyrene.

The starting materials are preferably pure or substantially pure materials, i.e. of a commercial grade, although mixtures of the isomeric compounds, alone, or in admixture with other reactive compounds or with inert diluents or isomers of the compounds can also be used. In this connection it may be mentioned that vinyltoluene is available commercially as a mixture consisting approximately of 65 percent by weight of meta-vinyltoluene and 35 percent by weight of para-vinyltoluene. The ar-ethylstyrene can be obtained as a product consisting of a mixture of from about 25 to about 55 percent by weight of divinylbenzene and correspondingly from about 75 to about 45 percent of ar-ethylstyrene, in which product the isomeric constituents consist of about 65 percent by weight of the meta isomer and about 35 percent of the para isomer, respectively. The dichlorostyrenes are usually obtained as a mixture of the isomeric compounds consisting predominantly of 2,4- and 2,5-dichlorostyrenes with lesser amounts of other isomeric compounds.

The hexachlorocyclopentadiene starting material is a known compound.

The reaction can be carried out at temperatures between about 70° and 180° C., preferably from 90° to 150° C., and at atmospheric, subatmospheric or superatmospheric pressure, but is advantageously carried out at atmospheric pressure or thereabout and in the presence of an inert organic liquid which is a solvent for the reactants and/or product.

Examples of suitable organic liquids which can be employed as the reaction medium are saturated aliphatic hydrocarbons such as hexane, heptane, octane, nonane or petroleum ether and aromatic hydrocarbons or nuclear halogenated aromatic hydrocarbons, e.g. benzene, toluene, xylene, cumene, ethylbenzene, ethyltoluene, diethylbenzene, chlorobenzene, ortho-dichlorobenzene, chlorotoluene, chloroethylbenzene, chloroxylene and the like. The organic liquid or solvent is employed in an amount sufficient to form a solution or slurry which can conveniently be stirred.

In carrying out the reaction in an inert organic liquid it is advantageous to dissolve the hexachlorocyclopentadiene in the organic solvent, then to add the monovinyl aromatic compound to the solution at reaction temperatures between 70 and 180° C. with stirring and at about the rate it is consumed in the reaction, whereby the reacting mixture is maintained at its refluxing temperature or thereabout.

The reactants can be employed in any desired proportions, but are preferably used in amounts not exceeding a stoichiometric proportion, i.e. an amount not greater than one gram molecular proportion of the hexachlorocyclopentadiene per gram molecular proportion of the monovinyl aromatic compound containing the chemically equivalent vinyl group ($H_2C=CH-$).

After feeding the desired amount of the reactants into admixture with one another, either alone, but preferably in an inert liquid organic reaction medium, the resulting mixture is stirred and maintained at reaction temperatures for a period sufficient to complete or substantially complete the reaction. In general, the reaction is exothermic and proceeds rapidly with increase in temperature within the range stated, but is dependent in part upon the proportion of the solvent employed. The reaction is substantially complete in from one to twelve hours, but longer reaction times can be employed.

Upon completing the reaction the mixture is cooled to crystallize the product, if crystalline, or if crystallization of the product does not occur, the solvent or a portion thereof is distilled, suitably by heating the reaction mixture at a temperature not exceeding about 140° C. and under atmospheric pressure, if required, sufficient to distill the solvent, then cooling the residue to crystallize and recover the product.

It may be mentioned that in making the adduct of hexachlorocyclopentadiene and ar-ethyl styrene employing a mixture of ethylvinylbenzene and divinylbenzene as the starting material, the procedure described above is advantageously employed for separating the crystalline by-product adduct of the hexachlorocyclopentadiene with the divinylbenzene from the liquid mixture which contains the adduct of the hexachlorocyclopentadiene and the ethylvinylbenzene (ar-ethyl styrene). After separating the crystalline by-product from the reaction mixture, the liquid product, i.e. the adduct of the hexachlorocyclopentadiene and the ar-ethyl styrene, is recovered in usual ways, e.g. by distillation.

Alternatively, when the product is a liquid material such as is the adduct of hexachlorocyclopentadiene and vinyltoluene, the product is recovered from the reaction mixture by distillation under reduced pressure.

The following examples illustrate ways in which the principle of the invention has been applied, but are not to be construed as limiting its scope.

*Example 1*

A charge of 819 grams (3 moles) of hexachlorocyclopentadiene and 1500 ml. of n-heptane was placed in a glass reaction flask equipped with a reflux condenser, a dropping funnel, and a stirrer. The solution was stirred and heated to a refluxing temperature. Thereafter, 354 grams (3 moles) of vinyltoluene (a commercial mixture of about 65 percent by weight of meta-vinyltoluene and 35 percent of para-vinyltoluene) was added with stirring over a period of 30 minutes and at a rate such that the reaction was readily controlled. The resulting mixture was stirred and maintained at refluxing temperatures for 12 hours. The solvent was removed by distillation under reduced pressure after which the residue was fractionally distilled. There was obtained 1100 grams of a mixture of isomeric 1,2,3,4,7,7-hexachloro-6-meta- and para-tolylbicyclo[2.2.1]hept-2-ene as a colorless liquid boiling at 163.5° C. at 0.8 millimeter absolute pressure and having a refractive index $N_D^{25}$ 1.5828. The product was a mixture of the adducts of the meta- and para-vinyltoluene with the hexachlorocyclopentadiene. It was analyzed.

|   | Found | Theoretical |
|---|---|---|
| C | 43.10 | 43.01 |
| H | 2.65 | 2.58 |
| Cl | 54.25 | 54.41 |

1,2,3,4,7,7 - hexachloro - 6 - meta - tolylbicyclo[2.2.1]-hept-2-ene is a new compound having the structural formula:

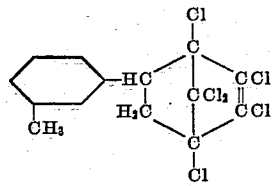

and 1,2,3,4,7,7 - hexachloro - 6 - para - tolylbicyclo-[2.2.1]hept-2-ene is a new compound having the structural formula:

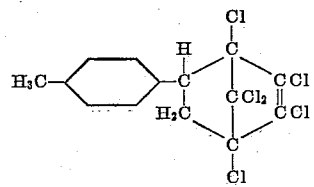

The compound is useful for the control of bean virus. In a test of the compound a leaf of a pinto bean plant was inoculated with Southern Bean Mosaic Virus, then was sprayed with an aqueous spray solution containing 0.25 pound of the 1,2,3,4,7,7-hexachloro-6-meta- and para-tolylbicyclo[2.2.1]hept-2-ene, prepared above, per 100 gallons of the spray solution, to the point just short of run-off of the solution from the leaf. The plants, together with inoculated but unsprayed bean plants as control, were placed in a greenhouse for a period of 7 days. Thereafter, the extent of disease on the treated and the untreated plants was observed and the disease on the inoculated and treated leaf interpreted as the percent of the disease checks. The control of the Southern Bean Mosaic Virus was 65 percent. Stated differently, the inoculated and sprayed bean leaf had only 35 percent as many disease checks as the unsprayed control bean plants.

In contrast, no control of the Southern Bean Mosaic Virus was obtained employing 1,2,3,4,7,7-hexachloro-6-phenylbicyclo[2.2.1]hept-2-ene under otherwise similar test conditions.

*Example 2*

A charge of 819 grams (3.0 moles) of hexachlorocyclopentadiene and 1700 ml. of n-pentane was placed in a glass reaction vessel equipped with a reflux condenser, a dropping funnel, and a stirrer. The solution was stirred, and heated to a reflux temperature. Thereafter, 519 grams (3.0 moles) of dichlorostyrenes was added with stirring over a period of 45 minutes and at a rate such that the reaction was readily controlled at the refluxing temperature of the mixture. The dichlorostyrene employed in the experiment was a liquid mixture boiling at 40°–41° C. at 0.1 millimeter absolute pressure having a density of 1.2520 at 25° C. and a refractive index $N_D^{25}$ 1.5785 and consisted of 45 percent by weight of 2,4-dichlorostyrene and 35 percent by weight of 2,5-dichlorostyrene, the remainder being 2,6- and 2,3-dichlorostyrenes. After adding the dichlorostyrene, the resulting mixture was stirred and heated under refluxing conditions for a period of 17 hours. Thereafter, solvent was removed by distillation under reduced pressure until the residue was about one-half of the initial volume. The residue was filtered, then cooled. A crystalline product precipitated. It was separated by filtering and was recrystallized from heptane. There was obtained 211 grams of 1,2,3,4,7,7-hexachloro-6-(2,4-dichlorophenyl)bicyclo-[2.2.1]hept-2-ene as a white crystalline material melting at 127°–128° C. It was analyzed.

|   | Found | Theoretical |
|---|---|---|
| C | 35.05 | 35.02 |
| H | 1.46 | 1.36 |
| Cl | 63.13 | 63.62 |

1,2,3,4,7,7 - hexachloro - 6 - (2,4 - dichlorophenyl)bi-cyclo[2.2.1]hept-2-ene is a new compound having the structural formula:

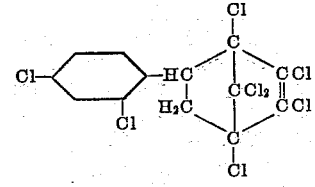

It is useful as an aquatic herbicide. In a test of its utility for the control of Ceratophyllum species (Coontail) 90 percent kill of the weeds was obtained when the weeds were exposed for one hour to an aqueous solution in a tank containing 100 parts by weight of the 1,2,3,4,7,7 - hexachloro - 6 - (2,4 - dichlorophenyl)bi-cyclo[2.2.1]hept-2-ene per million parts by weight of the aqueous solution.

In contrast no kill of the Ceratophyllum species of water weed was obtained employing 1,2,3,4,7,7-hexachloro-6-phenylbicyclo[2.2.1]hept-2-ene under otherwise similar test conditions.

*Example 3*

A charge of 273 grams (1 mole) of hexachlorocyclopentadiene and 500 ml. of n-heptane was placed in a glass reaction vessel equipped with a reflux condenser, a dropping funnel and a stirrer. The mixture was stirred and heated to a refluxing temperature. Thereafter, 160 grams of 4-tert.-butylstyrene was added dropwise over a period of one hour. The resulting mixture was stirred and heated at a refluxing temperature for 70 hours to complete the reaction, then was cooled. A crystalline material precipitated. It was separated by filtering. The filtrate was concentrated by evaporating a portion of the solvent, then was cooled and a further amount of crystalline material obtained. The crystalline materials were combined and recrystallized from n-heptane. There was obtained a total of 406.5 grams of 1,2,3,4,7,7-hexachloro-6-(4-tert.-butylphenyl)bicyclo[2.2.1]-hept-2-ene as a white crystalline product melting at 103.5°–104° C. The product was analyzed.

|  | Found | Theoretical |
|---|---|---|
| C | 47.10 | 47.15 |
| H | 3.83 | 3.72 |
| Cl | 48.87 | 49.13 |

1,2,3,4,7,7 - hexachloro - 6-(4 - tert. - butylphenyl)bicyclo-[2.2.1]hept-2-ene is a new compound having the structural formula:

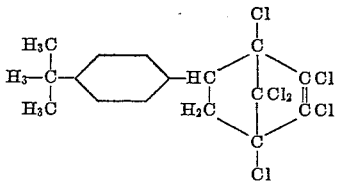

It is useful as an insecticide. In a test of its utility for the control of *Epilachna varivestis* (Mexican bean beetle larva), bean plants were sprayed with an aqueous spray solution containing 0.42 pound of the 1,2,3,4,7,7-hexachloro - 6 - (4 - tert. - butylphenyl)bicyclo-[2.2.1] hept-2-ene per 100 gallons of the spray solution. The sprayed plants were infested with the Mexican bean beetle larva and were held in the greenhouse for a period of 3 days. Thereafter, the plants were observed and the kill of the bean beetle larva noted. Eighty percent of the bean beetle larva were killed in the test.

In contrast, no control or kill of the Mexican bean beetle larva was obtained employing 1,2,3,4,7,7-hexachloro-6-phenylbicyclo[2.2.1]hept-2-ene under otherwise similar test conditions.

*Example 4*

A charge of 900 grams (3.3 moles) of hexachlorocyclopentadiene and 1000 ml. of toluene was placed in a glass reaction vessel equipped with a reflux condenser, a dropping funnel and a stirrer. The mixture was stirred and heated to a temperature of 100° C. Thereafter, 264 grams of a commercial grade of divinylbenzene (a mixture of about 55 percent by weight of divinylbenzene and about 45 percent ethylvinylbenzene and consisting of approximately 65 percent by weight of meta isomers and 35 percent of para isomers of said compounds was added over a period of about 30 minutes. The resulting mixture was stirred and maintained at refluxing temperatures between 115° and 119° C. for a period of 4 hours. Thereafter, most of the toluene was removed by distilling the same under reduced pressure. The residue which was a slurry of liquid and crystalline materials was mixed with 1000 ml. of n-heptane and was stirred and cooled in an ice bath. The crystalline product was separated by filtering and was washed with pentane and dried. There was obtained 637 grams of a mixture of meta- and para-bis(1,4,5,6,7,7-hexachlorobicyclo[2.2.1] - 5 - hepten - 2-yl)benzene as white crystals melting at 150°–155° C. The filtrate consisting of solvent and the adduct resulting from the reaction of the hexachlorocyclopentadiene with the meta- and para-ethylvinylbenzenes was collected and combined with the filtrates obtained in a series of similar experiments. The combined filtrates were distilled under reduced pressure to remove and separate the solvent. The residue was fractionally distilled. There was obtained a mixture of isomeric 1,2,3,4,7,7-hexachloro-6-(meta- and para-ethylphenyl)bicyclo[2.2.1]hept-2-ene as a colorless liquid boiling at 194° C. at 2.2 millimeters absolute pressure and having a refractive index $N_D^{25}$ 1.5750. The product was analyzed.

|  | Found | Theoretical |
|---|---|---|
| C | 44.62 | 44.48 |
| H | 2.90 | 2.99 |
| Cl | 52.42 | 52.53 |

1,2,3,4,7,7 - hexachloro - 6 - (meta - ethylphenyl)bicyclo [2.2.1]-hept-2-enes is a new compound having the structural formula

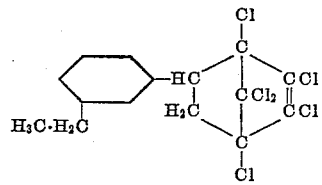

1,2,3,4,7,7 - hexachloro - 6 - (para - ethylphenyl)bicyclo [2.2.1]-hept-2-ene is a new compound having the structural formula

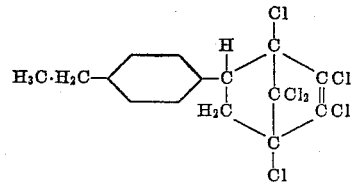

The meta- and para-1,2,3,4,7,7-hexachloro-6-(ethylphenyl)bicyclo[2.2.1]hept-2-enes are useful as aquatic herbicides. In a test of the compounds for the control of water weeds, Ceratophyllum species (Coontail), 90 percent kill of the weeds was obtained when the weeds were exposed for one hour to an aqueous solution in a tank containing 100 parts by weight of the isomeric 1,2,3,4,7,7-hexachloro - 6 - (meta- and para-ethylphenyl) bicyclo[2.2.1]-hept-2-ene, prepared above, per million parts by weight of the aqueous solution.

In contrast, no kill of the weed Ceratophyllum species was obtained employing 1,2,3,4,7,7-hexachloro-6-phenylbicyclo[2.2.1]hept-2-ene under otherwise similar test conditions.

We claim:
1. A composition of matter consisting of the adduct of one gram molecular proportion of hexachlorocyclopentadiene with one gram molecular proportion of a monovinyl aromatic compound selected from the group consisting of vinyltoluene, ar-ethylvinylbenzene, 4-tert.-butylstyrene and 2,4-dichlorostyrene.

2. A composition of matter consisting of an adduct of one gram molecular proportion of hexachlorocyclopentadiene with one gram molecular proportion of vinyltoluene, said adduct having the structural formula:

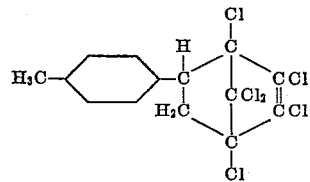

3. A composition of matter consisting of an adduct of one gram molecular proportion of hexachlorocyclopentadiene with one gram molecular proportion of ar-ethylvinylbenzene, said adduct having the structural formula:

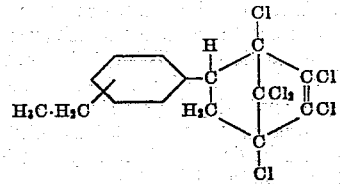

4. A composition of matter consisting of the adduct of one gram molecular proportion of hexachlorocyclopentadiene with one gram molecular proportion of 4-tert.-butylstyrene, said adduct having the structural formula:

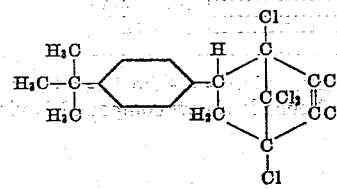

5. A composition of matter consisting of the adduct of one gram molecular proportion of hexachlorocyclopentadiene with one gram molecular proportion of 2,4-dichlorostyrene, said adduct having the structural formula:

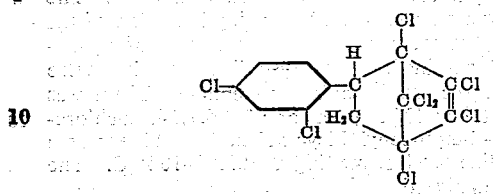

References Cited in the file of this patent
UNITED STATES PATENTS 2,606,910    Herzfeld et al. _____ Aug. 12, 1952